US011055725B2

(12) United States Patent
Zeckser et al.

(10) Patent No.: US 11,055,725 B2
(45) Date of Patent: Jul. 6, 2021

(54) SYSTEM AND METHOD FOR TEMPORAL FEASIBILITY ANALYSES (71) Applicant: HOMEADVISOR, INC., Golden, CO (US)

(72) Inventors: Paul Zeckser, Denver, CO (US); Brandon Ridenour, Denver, CO (US); Andrew Tilley, Westminster, CO (US); Patrick Davis, Evergreen, CO (US); Casey Laird, Littleton, CO (US); Eric Smith, Golden, CO (US)

(73) Assignee: HOMEADVISOR, INC., Golden, CO (US)

( * ) Notice: Subject to any disclaimer, the term of this patent is extended or adjusted under 35 U.S.C. 154(b) by 419 days.

(21) Appl. No.: 15/925,443

(22) Filed: Mar. 19, 2018

(65) Prior Publication Data
US 2018/0268419 A1 Sep. 20, 2018

Related U.S. Application Data (60) Provisional application No. 62/473,959, filed on Mar. 20, 2017.

(51) Int. Cl.
G06Q 30/00 (2012.01)
G06Q 50/10 (2012.01)
G06Q 10/06 (2012.01)

(52) U.S. Cl.
CPC ..... *G06Q 30/016* (2013.01); *G06Q 10/06311* (2013.01); *G06Q 50/10* (2013.01)

(58) Field of Classification Search
CPC .. G06Q 50/08; G06Q 10/06311; G06Q 50/10; G06Q 30/016
See application file for complete search history.

(56) References Cited

U.S. PATENT DOCUMENTS 7,580,862 B1 * 8/2009 Montelo ............... G06Q 10/10
705/26.1
10,122,671 B2 * 11/2018 Donahoe ............... G06Q 50/10
(Continued)

FOREIGN PATENT DOCUMENTS

CN 106203661 A * 12/2016

OTHER PUBLICATIONS

Bas, Anu, Markku, Tinnila, and Rajahonka, Mervi, "Matching Service Strategies, Business Models and Modular Business Practices", Business Process Management Journal, vol. 16, No. 1 (2010) accessed Feb. 12, 2021 (Year: 2010).*
(Continued)

Primary Examiner — Paul R Fisher
Assistant Examiner — Andrew Chase Lakhani
(74) Attorney, Agent, or Firm — Michael Best & Friedrich LLP (57) ABSTRACT A system and method for temporal feasibility analyses that links a service requirement to a source capable of providing a service. In embodiments, the service requirement is received from a requestor, wherein the service requirement defines a type of service, location, and a request to provide the service within a predetermined time period. A repository of sources is analyzed to determine qualified sources that provide service to a region that includes the service location and have a response status greater than a predefined threshold, where the response status indicates a probability of the source being available to provide the service within the time period. A request is sent to each qualified source to provide the service, and responses are then received from at least one of the qualified sources in response to sending the request.

12 Claims, 8 Drawing Sheets

(56) References Cited

U.S. PATENT DOCUMENTS

| | | | |
|---|---|---|---|
| 2002/0038233 A1* | 3/2002 | Shubov | G06Q 30/0611 705/26.4 |
| 2003/0182413 A1* | 9/2003 | Allen | H04L 12/14 709/223 |
| 2003/0187710 A1* | 10/2003 | Baumer | G06Q 10/06311 705/7.13 |
| 2006/0184381 A1* | 8/2006 | Rice | G06Q 30/0601 705/26.1 |
| 2007/0220123 A1* | 9/2007 | Agrawal | G06F 16/29 709/223 |
| 2007/0288334 A1* | 12/2007 | Creedle | G06Q 10/06315 705/35 |
| 2009/0216602 A1* | 8/2009 | Henderson | G06Q 10/00 705/7.41 |
| 2009/0319523 A1* | 12/2009 | Anderson | G06F 16/24575 |
| 2011/0137730 A1* | 6/2011 | McCamey | G06Q 30/0203 705/14.58 |
| 2012/0053976 A1* | 3/2012 | Hu | G06Q 10/06311 705/7.13 |
| 2012/0179617 A1* | 7/2012 | Adams | G06Q 10/02 705/321 |
| 2014/0025524 A1 | 1/2014 | Sims et al. | |
| 2014/0136259 A1* | 5/2014 | Kinsey, II | G06Q 10/1095 705/7.16 |
| 2015/0046193 A1* | 2/2015 | Harmon | G06Q 40/08 705/4 |
| 2015/0302330 A1* | 10/2015 | Banner | G06Q 10/06 705/7.13 |
| 2015/0347940 A1* | 12/2015 | Doganata | G06Q 10/06311 705/7.13 |
| 2016/0140507 A1* | 5/2016 | Stevens | G06Q 10/1097 705/7.19 |
| 2016/0292724 A1 | 10/2016 | Horovitz et al. | |
| 2017/0046644 A1* | 2/2017 | Zhang | G06Q 10/06311 |
| 2017/0140323 A1* | 5/2017 | Laird | H04L 67/322 |

OTHER PUBLICATIONS

Hadoop Performance Modeling for Job Estimation and Resource Provisioning Khan, Mukhtaj; Yong Jin; Maozhen Li; Yang Xiang; Changjun Jiang. IEEE Transactions on Parallel and Distributed Systems 27.2: 441-54. IEEE Computer Society. (Feb. 2016) (Year: 2016).*

Mosheiov, G and Sarig, A "A due-window assignment problem with position-dependent processing times" Journal of the Operation Research Society, vol. 59, No. 7 (2008) (Year: 2008).*

* cited by examiner

1. Sort by SP hunger
2. In cases of equal hunger, sort by SP's $q$ score, where $q$ is defined by the following:

Globally,

- Let $C$ = number of historical confirmed SDB appointments in last $D$ days
- Let $N$ = number of historical attempted SDB appointments in last $D$ days
- Let $P = \frac{C}{N}$ For each SP $i$,

- Let $c_i$ = number of historical confirmed SDB appointments for SP $i$ in last $d$ days
- Let $n_i$ = number of historical attempted SDB appointments for SP $i$ in last $d$ days
- If $n_i > 0$, let $p_i = \frac{c_i}{n_i}$
- If $n_i = 0$, let $p_i = P$
- Let $r_i$ = a random number drawn from a normal distribution with mean = 0 and standard deviation = 1, achievable in Java via *nextGaussian()*
- Similarly, let $t_i$ = a random number drawn from a normal distribution with mean = 0 and standard deviation = 1
- Set $h_i = p_i + t_i$
- Set $q_i = \frac{o*h_i + \frac{1}{s} + r_i * \sqrt{o*abs(h_i)*abs(1-h_i)}}{o} - t_i$ where $D$, $d$, $o$, and $s$ are globally-set tuning parameters, and abs is the absolute value function.

SYSTEM AND METHOD FOR TEMPORAL FEASIBILITY ANALYSES

RELATED APPLICATIONS

This application claims priority to U.S. Patent Application Ser. No. 62/473,959, titled "System and Method for Temporal Feasibility Analyses," filed Mar. 20, 2017, and incorporated herein by reference.

SUMMARY

A system and method for temporal feasibility analyses that links a service requirement to a source capable of providing a service. In embodiments, the service requirement is received from a requestor, wherein the service requirement defines a type of service, location, and a request to provide the service within a predetermined time period. A repository of sources is analyzed to determine qualified sources that provide service to a region that includes the service location and have a response status greater than a predefined threshold, where the response status indicates a probability of the source being available to provide the service within the time period. A request is sent to each qualified source to provide the service, and responses are then received from at least one of the qualified sources in response to sending the request.

DETAILED DESCRIPTION OF THE EMBODIMENTS

Figure 1:
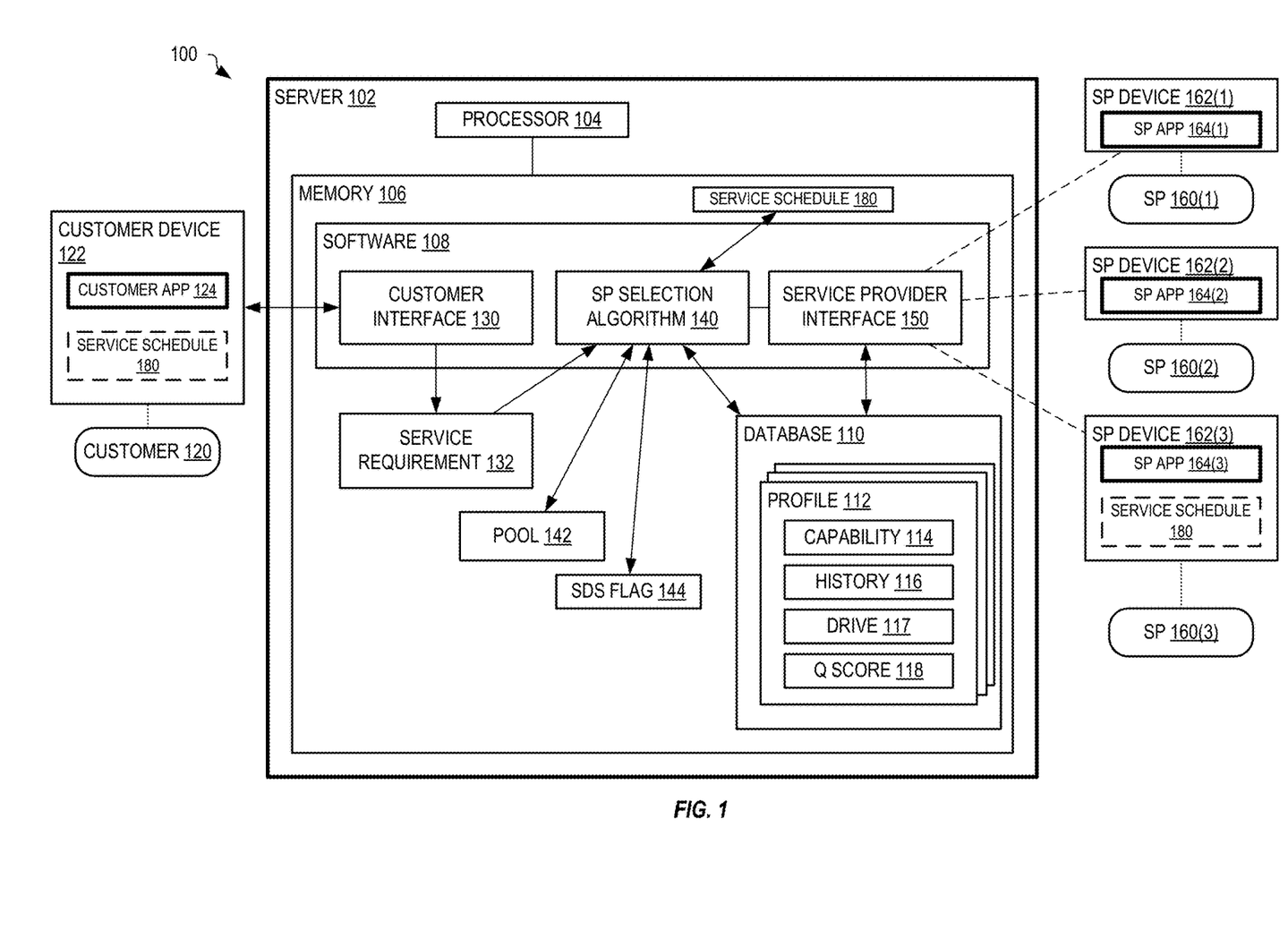
FIG. 1 shows one example system for matching a customer service requirement to a service provider (SP) capable of providing a service to meet the service requirement, in an embodiment.

FIG. 1 shows one example system 100 for linking a service requirement to a source capable of providing a service to meet the service requirement. System 100 includes a server 102 that may be located in the cloud and/or connected to one or more networks such as the Internet, cellular networks, Wi-Fi networks, and so on. Server 102 is, for example, a computer that has at least one digital processor 104 and a memory 106. Memory 106 represents one or both of volatile memory (e.g., one or more of RAM, SRAM, DRAM, and so on) and non-volatile memory (e.g., one or more of ROM, FLASH, magnetic, optical, and so on).

Memory 106 stores software 108 having machine readable instructions that may be executed by processor 104 to provide functionality of system 100 as described herein. Memory 106 is also shown storing a database 110. However, database (repository) 110 may be stored external (e.g., within a network data store or external database) to server 102 without departing from the scope hereof.

A plurality of service providers (sources) 160 each communicate, using a service provider device 162, with a service provider interface 150 of server 102 to register their service providing capability with server 102. Service provider device 162 is a computer such as selected from the group including a smartphone, a tablet, a notebook, a personal computer, a desktop computer, and so on. In certain embodiments, service provider interface 150 is a web-based interface and service provider device 162 uses a service provider application 164 to facilitate interaction via, at least in part, the Internet with service provider interface 150. Where service provider device 162 is one of a smartphone, a tablet, and other such similar devices, service provider application 164 is an app that may be downloaded to service provider device 162.

As shown in FIG. 1, within database 110, each service provider 160 has a corresponding profile 112 that stores capability 114 defining tasks (e.g., plumbing, carpentry, etc.) that may be provided as a service by the service provider 160 and an area (e.g., geographic area, zip-code(s), and so on) where the service may be performed. Capability 114 may also define whether the corresponding service provider 160 is capable of providing (e.g., has elected to offer) a same-day service for one of more of their listed tasks. For example, service provider application 164 may include a flag (e.g., a value that toggles between true and false) that is configurable by service provider 160 to indicate whether they are interested in performing same day services, wherein service provider application 164 sends the status of this flag to service provider interface 150, which in turn updates the corresponding profile 112 within database 110. The examples used herein relate to same-day service (SDS also referred to as same-day business or SDB). However, other time periods may be defined for the service to be performed in without departing from the scope hereof. For example, service provider 160 may specify that the service may be performed the following day, within 24 hours, and so on. Capability 114 may also define an estimated cost (and/or range of costs) for each identified task to be performed by service provider 160.

A customer (requestor) 120 in need of a service by a third party uses a customer device 122 to interact with a customer interface 130 of server 102 to define a service requirement 132. Customer device 122 is, for example, a computer selected from the group including a smartphone, a tablet, a notebook, a personal computer, a desktop computer, and so on. Customer device 122 may run a customer application 124 that is, for example, downloaded to customer device 122 to facilitate interaction with customer interface 130. Service requirement 132 is generated and stored within memory 106 to define at least a type of task to be performed for customer 120 and a location where the task is to be performed. Service requirement 132 may further define a budget (e.g., expected cost range) for the requested service.

Server 102 uses a service provider selection algorithm 140 to search profiles 112 within database 110 and generate a pool 142 identifying service providers 160 that may be able to fulfill service requirement 132. For example, service provider selection algorithm 140 may generate pool 142 identifying service providers 160 capable of performing the task(s) defined within service requirement 132, and where the location for the service defined within service requirement 132 is within the area defined by the service provider. Pool 142 may be ordered by service provider selection algorithm 140 based upon one or both of (a) drive 117 of the service provider (e.g., sorted into descending order based upon a work capacity of the service provider 160) and (b) historical response rate of the service provider. Drive (hunger) 117 indicates a need or desire of service provider 160 for work. In one example, drive 117 may be based upon a number of leads that service provider 160 wishes to receive each month, a current workload of service provider 160, and a work capacity of service provider 160. For example, where service provider 160 has a budget of $500 per month to receive leads from system 100, drive 117 may be adjusted according to a number of leads already received by service provider 160 and progress through the current month. Accordingly, drive 117 is adjusted to ensure that service provider 160 receives the desired amount of leads each month. Drive 117 may also be adjusted based upon a prediction of how many service requirements 132 service provider 160 is likely to fulfil during that period. In certain embodiments, service provider 160 may define their capacity for work as a number of leads service provider 160 wants to receive each month, where the greater the number of leads, the greater the work capacity of the service provider, and the greater the value of drive 117, as compared to other service providers with less capacity.

In certain circumstances, the greater the work capacity of service provider 160, the more likely that customer 120 will be satisfied by service provider 160. Accordingly, service provider selection algorithm 140 orders pool 142 based upon ones of the selected service providers most likely to respond to, and fulfill, a request for same-day service. In other embodiments, service provider selection algorithm 140 may order pool 142 based upon a match between the defined budget of service requirement 132 and the estimated costs, within capability 114 for example, for the task of each service provider 160. In certain embodiments, service provider selection algorithm 140 may also select service providers 160 based upon one or both of a corresponding history 116 and a Q score 118 that are indicative of a probability of the service provider being available, responsive, and/or able to provide the service within the required time period. For example, Q score 118 may be calculated based upon 1) the drive 117 of service provider 160 for work, 2) history 116 indicative of how responsive service provider 160 has been for similar requests and 3) how satisfied previous customers have been with service provider 160. That is, Q score 118 may be based upon performance of service provider 160 to perform certain tasks. Further, service provider selection algorithm 140 may also set a same-day service flag 144 to indicate whether sufficient service providers 160 identified within pool 142 offer same-day service. Same-day service flag 144 thereby indicates whether an option for same day service may be interactively offered to customer 120 via customer interface 130 and customer device 122. For example, within moments of customer 120 interacting with customer application 124 and customer interface 130 to define service requirement 132, customer application 124 may offer a same-day service option to customer 120 based upon same-day service flag 144.

In certain embodiments, service provider selection algorithm 140 determines a number of service providers 160 to include within pool 142 based upon a desired success rate of selecting one service provider to fulfill the service requirement 132. For example, a desired success rate may be one of 90% and 95%, wherein, based upon previous success rates, service provider selection algorithm 140 determines a number of service providers to include within pool 142 such that the probability of one of them responding and fulfilling service requirement 132 matches the desired success rate. Where there are insufficient service providers that meet requirements for inclusion within pool 142, service provider selection algorithm 140 may clear same-day service flag 144 to indicate that same-day service is not possible for service requirement 132.

Similarly, the feasibility of same-day service may also be dependent upon the time of submission of service requirement 132. For example, where service requirement 132 is submitted by customer 120 at 6 pm, same-day service may not be permitted and/or expected. In certain embodiments, service provider selection algorithm 140 may implement a time window for submission of same-day service request. For example, same-day service requests may only be allowed between 7 am and 5 pm, and may not include holidays. These times may be configurable by a system administrator. In certain embodiments, same-day service requests are not restricted; however, service provider selection algorithm 140 may determine when same-day service is possible. For example, where service requirement 132 is generated at 11 pm, service provider selection algorithm 140 may determine that same-day service is not possible and thereby set a corresponding time period to include the following day. Further, service provider selection algorithm 140 may not permit same-day service for requests that define a service location that is a PO Box, or is not a valid or complete address. That is, the customer is required to provide a legitimate address for the requested service.

Where customer 120 elects to utilize the offered same-day service, service provider selection algorithm 140 may interactively (e.g., using service provider interface 150 and service provider application 164) solicit each service provider 160 identified within pool 142 to bid to perform service requirement 132. Service provider application 164 provides each corresponding service provider 160 with a period in which to respond to the solicitation. For service providers 160 that respond to the solicitation indicating that they are able to perform a same-day service for the service requirement 132, service provider selection algorithm 140 may utilize one or more of a corresponding history 116 and Q score 118 to select one service provider 160 for fulfilling service requirement 132.

Service provider selection algorithm 140 may then interact, via service provider interface 150 and service provider application 164, with the selected service provider 160 to create a service schedule 180 (shown stored within memory 106), which is also sent to customer 120 via customer interface 130 and customer application 124 running on customer device 122, for example. Thus, in embodiments, system 100 matches a customer service requirement (e.g., service requirement 132) to a service provider (e.g., service provider 160(3)) capable of providing a service to meet the service requirement, and automatically schedules the service when same-day service is requested.

Customer interface 130 may further interact with customer 120, using customer device 122 and customer application 124 for example, to collect an evaluation of the service provider's performance to complete work for service requirement 132. For example, one or both of customer interface 130 and customer application 124 may interactively survey customer 120 to determine one or more of timeliness, performance, and quality of the work performed by service provider 160(3), which is used to generate or update history 116 of the corresponding profile 112 within database 110. Further, service provider selection algorithm 140 may generate or update Q score 118 of the corresponding profile 112 within database 110 based upon timeliness of response to the solicitation and based upon the corresponding history 116.

Based upon service schedule 180, one or more of customer application 124, customer interface 130, service provider interface 150, and service provider application 164 may provide one or more reminders (e.g., 30 minutes before the appointment) to customer 120 and/or service provider 160.

With regard to FIG. 1, various means of communication may be used such as one or more of short message service (SMS), email, notifications, and so on.

Figure 2:
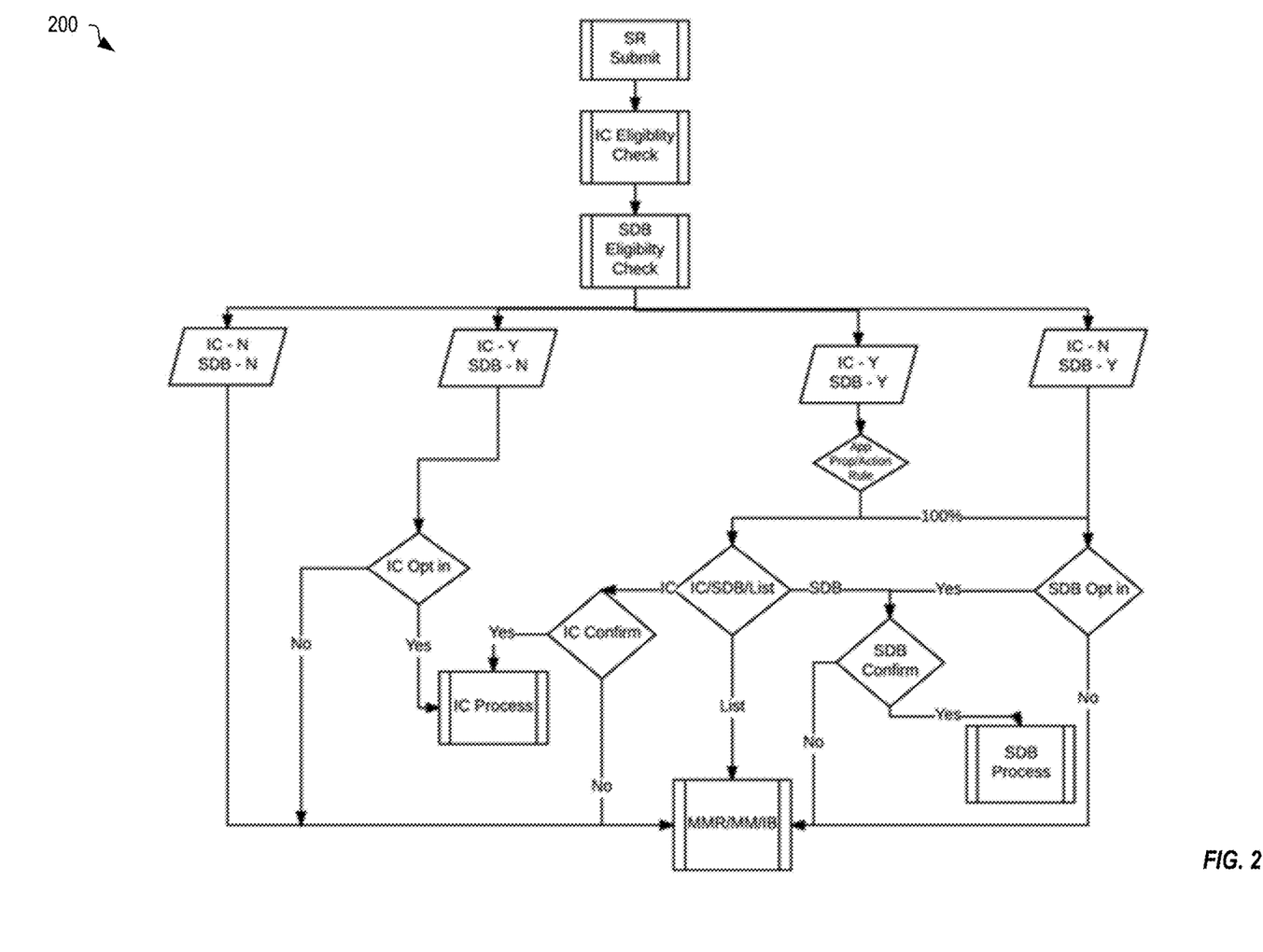
FIG. 2 is a flowchart illustrating one example method for matching a customer service requirement to a service provider capable of providing a service to meet the service requirement, in an embodiment.

FIG. 2 is a flowchart illustrating one example method 200 for selecting service providers for inclusion within pool 142 based upon service requirement 132. Method 200 is, for example, implemented within service provider selection algorithm 140 of FIG. 1. Method 200 is, for example, a decision process for determining if/when a same-day service is available and when it is not. An instant connect (IC) is where consumer 120 requests a phone call with service provider 160, for example. MMR/MM/IB represents a list of selected service providers 160 being displayed to consumer 120. Same-day service is offered where possible, and where not possible or not selected, consumer 120 may be offered a phone call with a selected service provider 160, and/or may be provided with a list of selected service providers.

Figure 3:
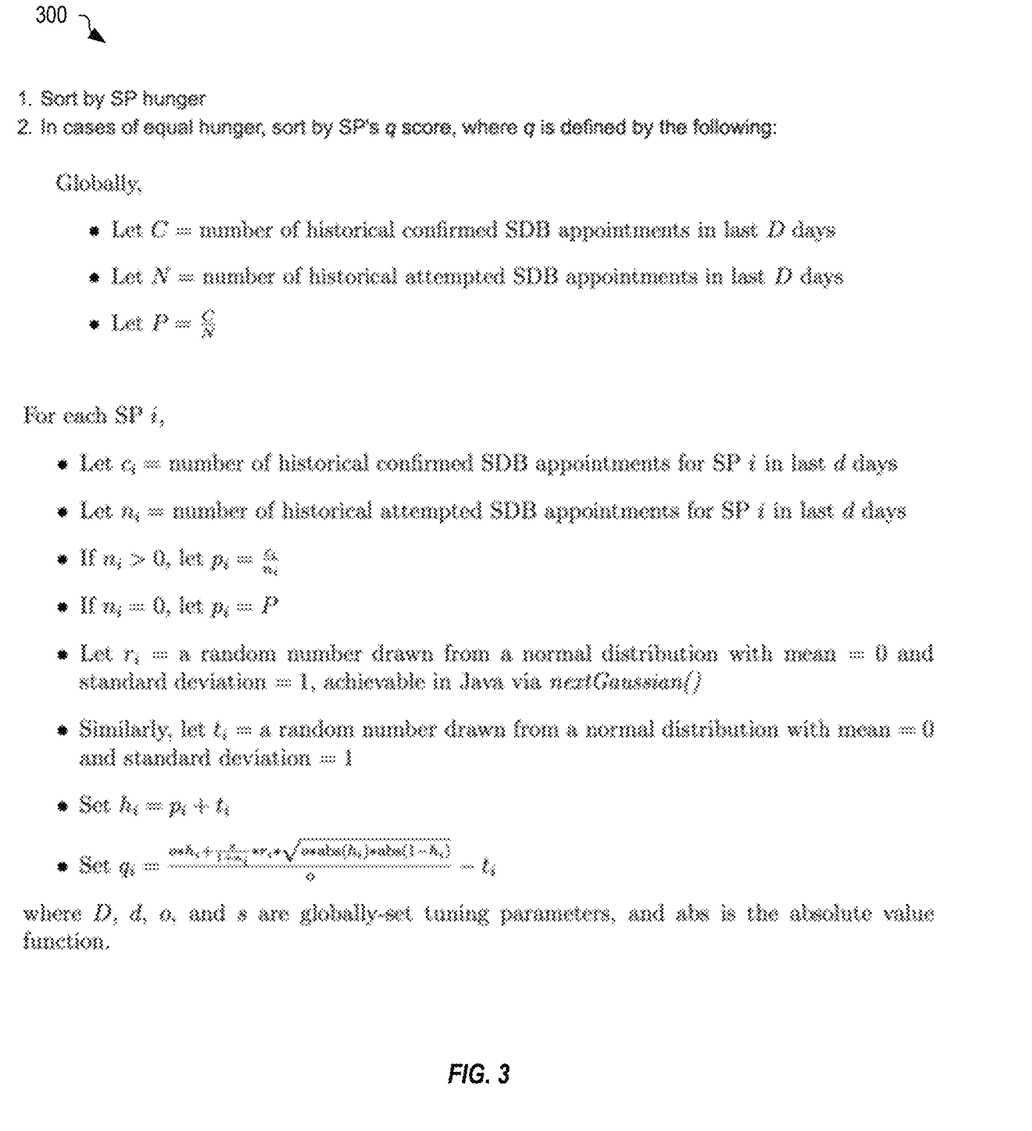
FIG. 3 shows an example formula for calculating the Q score of FIG. 1, in an embodiment.

FIG. 3 shows an example formula 300 for calculating Q score 118 of FIG. 1. Drive 117 also may be associated with an estimated cost, defined by the service provider 160, for performing a requested task. For example, the lower the estimated cost, as compared to estimates from other service providers, the greater the service provider's "drive" to perform the task. Particularly, variables (e.g., S, d, o and s) may be adjusted and/or weighted to tune function 300.

Figure 4:
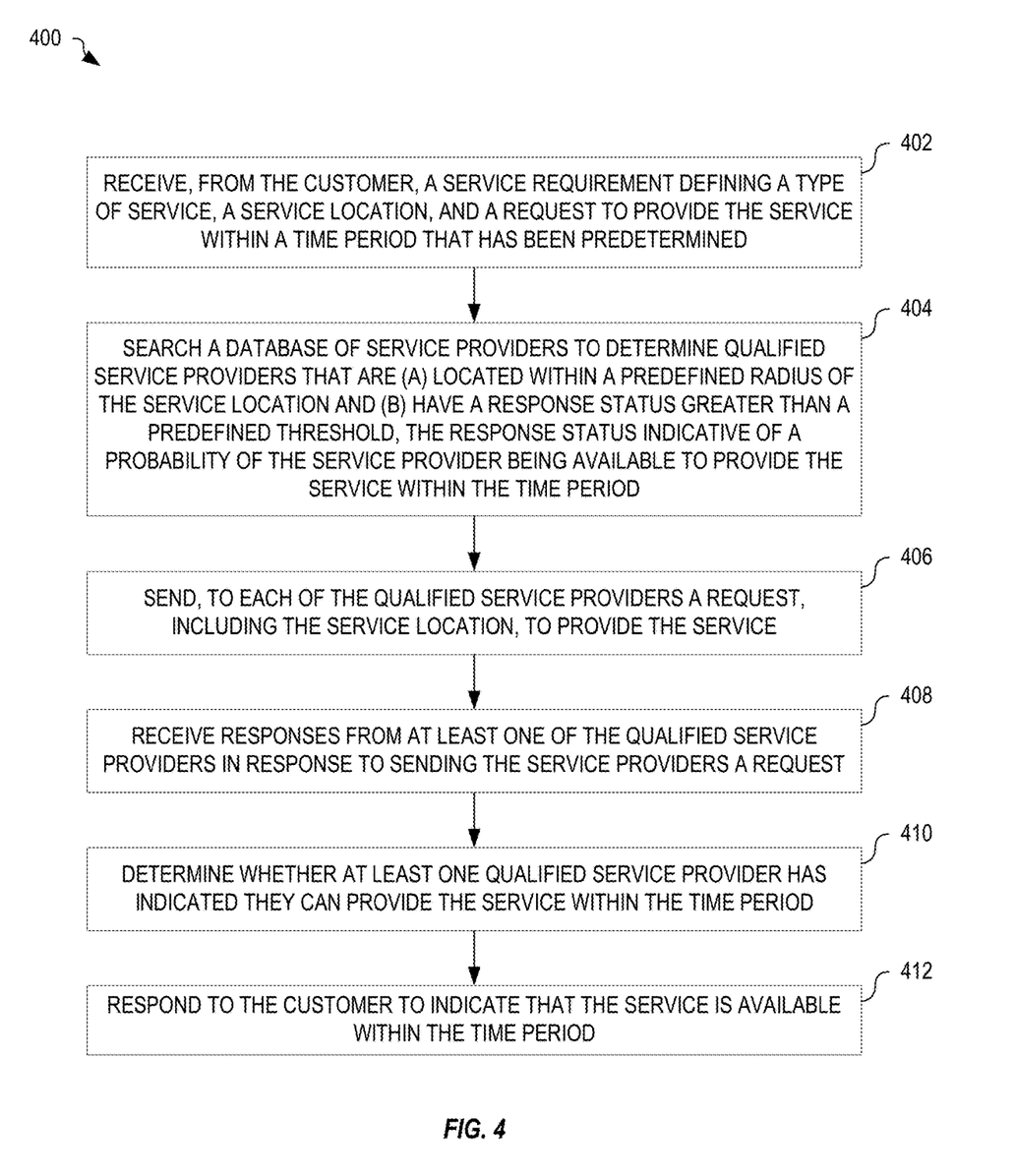
FIG. 4 is a flowchart illustrating one example method for matching a customer service requirement to a service provider capable of providing a service to meet the service requirement, in an embodiment.

FIG. 4 is a flowchart illustrating one example method 400 for matching (linking) a customer service requirement to a service provider capable of providing a service to meet the service requirement. Method 400 is, for example, implemented within server 102 of system 100, FIG. 1.

In step 402, method 400 receives, from a customer, a service requirement defining a type of service, a service location, and a request to provide the service within a time period that has been predetermined. For example, the time period may be defined as within five hours of receiving service requirement 132. In another example, the time period may be defined as one day. In another example, the time period is defined as two days. In one example of step 402, customer 120 is in need of a service by a third party and uses customer device 122 to interact with customer interface 130 of server 102 to define service requirement 132. In step 404, method 400 searches a database of service providers to determine qualified service providers that are (a) located within a predefined radius of the service location and (b) have a response status greater than a predefined threshold, the response status indicative of a probability of the service provider being available to provide the service within the time period. In one example of step 404, service provider selection algorithm 140 may create pool 142 to identify service providers 160 capable of performing the task(s) defined within service requirement 132, where a service area of the service provider 160 includes the location for the service defined within service requirement 132, and where one or both of a corresponding history 116 and Q score 118 indicate a probability of the service provider being available to provide the service within the required time period.

In step 406, method 400 sends, to each of the qualified service providers a request, including the service location, to provide the service. In one example of step 406, service provider selection algorithm 140 interactively (e.g., using service provider interface 150 and service provider application 164) solicits each service provider 160 identified within pool 142 to submit for fulfilling service requirement 132. In step 408, method 400 receives responses from at least one of the qualified service providers in response to sending the service providers a request. In one example of step 408, service provider application 164 provides each corresponding service provider 160 with a period in which to respond to the solicitation.

In step 410, method 400 determines whether at least one qualified service provider has indicated they can provide the service within the time period. In one example of step 410, service provider 160(3) respond to the solicitation indicating that they are able to perform a same-day service for service requirement 132. In step 412, method 400 responds to the customer to indicate that the service is available within the time period. In one example of step 412, customer application 124 offers a same-day service option to customer 120 based upon same-day service flag 144.

Figure 5:
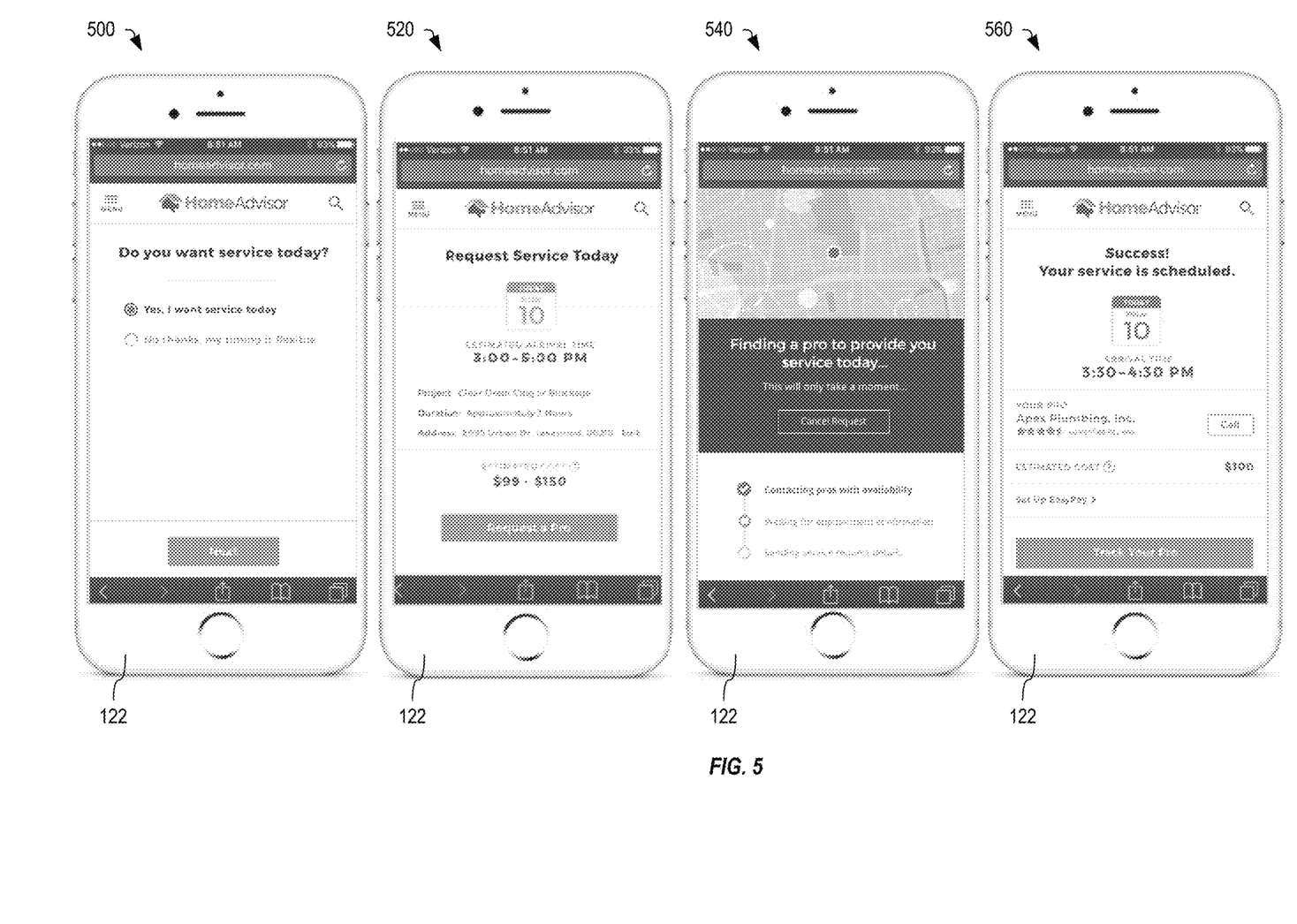
FIG. 5 shows four example screen shots generated by the customer interface of FIG. 1, in an embodiment.

FIG. 5 shows four exemplary screen shots 500, 520, 540, and 560, as generated by customer interface 130 as a web interface, illustrating example interaction with customer 120 to offer same-day service (screen shots 500, 520), an indication that a service provider is being selected (screen shot 540), and a schedule of the selected service (screen shot 560). In particular, screen shot 500 shows consumer 120 opting into same-day service. Screen shot 520 confirms the task and location for service requirement 132, and provides an estimated arrival time of service provider 160. Screen shot 540 informs customer 120 that service provider 160 is being contacted and that they should please wait. Screen shot 560 shows that service provider 160 has been successfully scheduled and shows an updated time of when service provider 160 will arrive. Screen shot 560 also specifically identifies selected service provider 160 to customer 120, shows the selected service provider's pricing, and ratings and reviews of the service provider.

Figure 6:
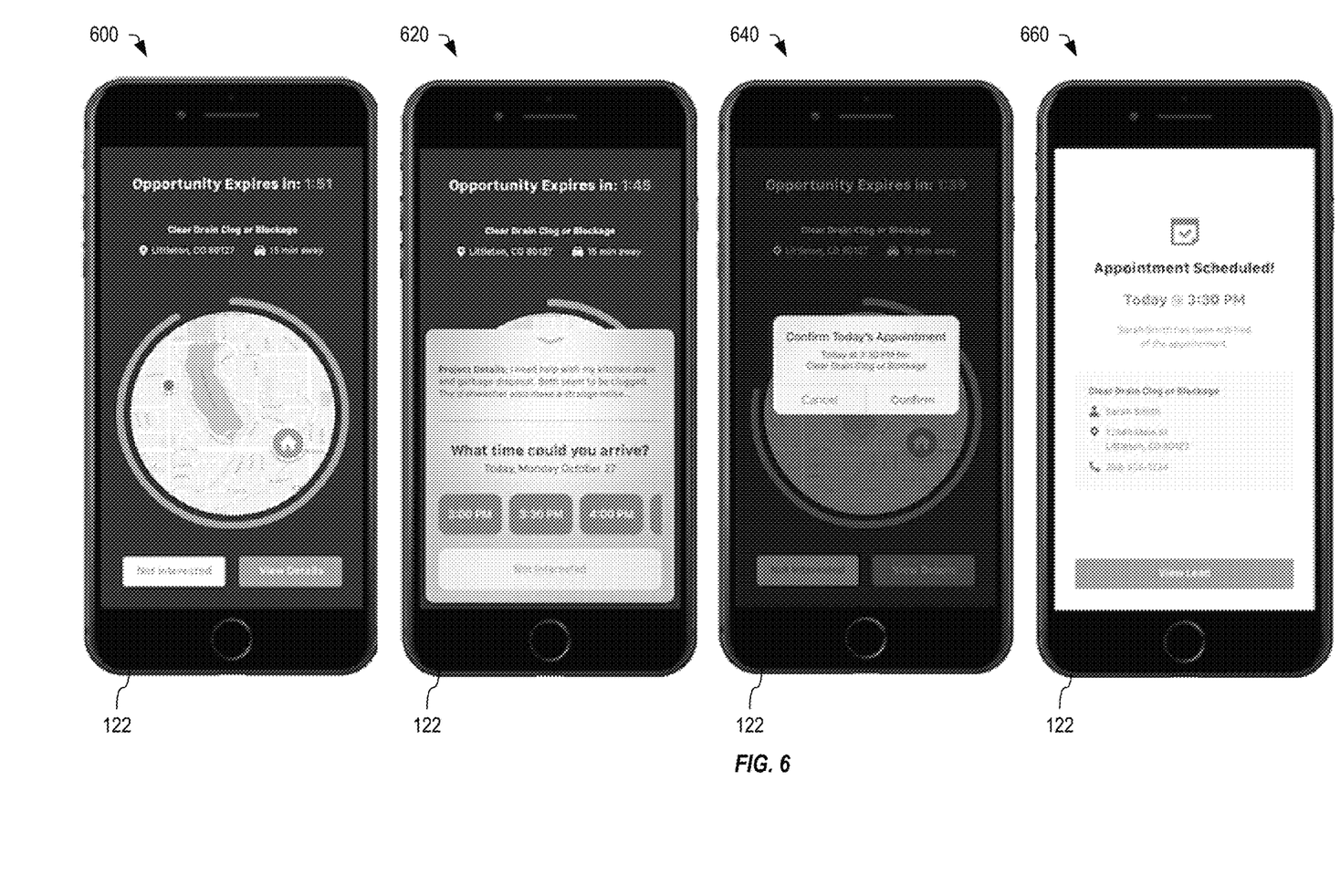
FIG. 6 shows four example screen shots generated by the service provider interface and/or the service provider application of FIG. 1, in an embodiment.

FIG. 6 shows four exemplary screen shots 600, 620, 640, and 660, as generated by service provider interface 150 and/or service provider application 164, illustrating example interaction with service provider 160. Screen shot 600 shows an example solicitation of service provider 160 for service requirement 132. As shown in screen shot 600, service provider 160 has one minute and fifty-one seconds to respond to the solicitation. As shown in screen shot 620, service provider application 164 requests an arrival time for the service from the service provider 160. In screen shot 640, service provider 160 is requested to confirm the selected appointment time. In screen shot 660, service provider application 164 provides a confirmation for the scheduled appointment.

Figure 7:
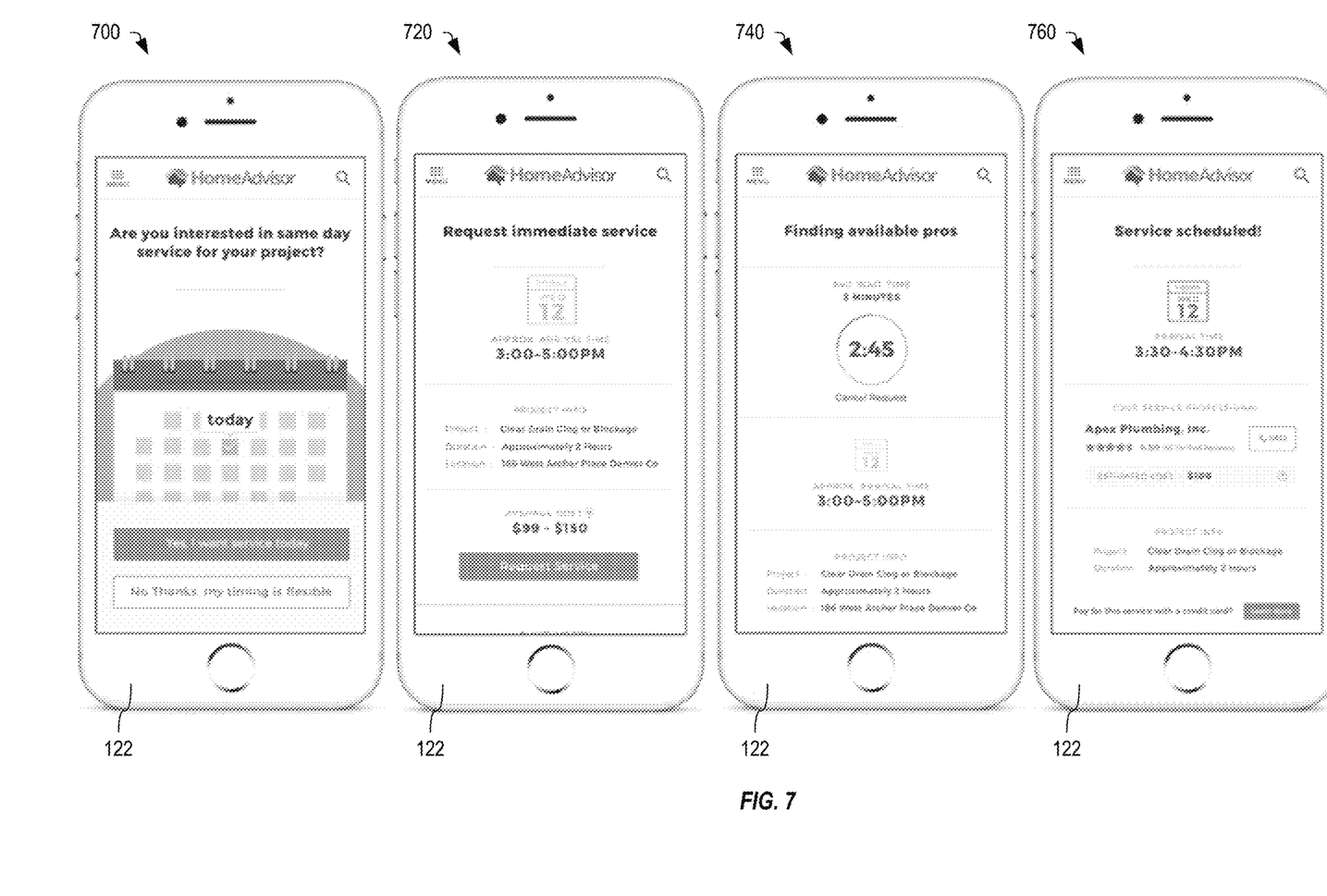
FIG. 7 shows four other example screen shots generated by the customer interface and the customer application of FIG. 1, in an embodiment.

FIG. 7 shows four exemplary screen shots 700, 720, 740, and 760, as generated by customer interface 130 and customer application 124, illustrating example interaction with customer 120 to offer same-day service (screen shots 700, 720), an indication of estimated time (screen shot 740) to find and confirm a service provider 160, and a confirmation for the scheduled service (screen shot 760).

Artificial Intelligence

One realization is that the greater the number of service providers 160 registered within database 110, and/or the greater the capabilities and/or availability of those service providers, the greater the probability of system 100 selecting one service provider 160 that will fulfill the customer service requirement 132. That is, the greater the pool of service providers 160 available to fulfill service requirement 132, the greater the probability of system 100 finding one service provider 160 to fulfill service requirement 132.

Another realization is that service providers 160 may be capable of more types of service than they have stated in capability 114. For example, where service provider 160 defines their capability 114 as water heater repair, they may also be capable of water heater installation, even though they have not admitted to this capability.

Another realization is that where service provider 160 defines their drive based upon a particular monthly spend target, the actual capacity of the service provider 160 may be greater. For example, where service provider 160 agrees to spend $500 per month on leads, where demand is high for the type of service they provide, they may be willing to accept more leads.

Another realization is that requirements for certain types of service may vary based upon a time of day, a day of the week, a time of year, and forecast weather conditions. For example, there is likely an increase in customers requesting air-conditioning maintenance immediately prior to the summer or when the first warm weather of the year is predicted. Also, the geographic area also affects climate and the type and quantity of customer requirements. For example, Florida will likely have different requirements than Minnesota for a particular time of the year. Demand may be accordingly predicted based in part upon historical data (e.g., history 116 or data derived therefrom) and in part from predicted weather conditions.

Any of the above realizations may combine to form other conditions that may affect the probability of providing service provider 160 to fulfill service requirement 132. For example, during the first period of warmer weather for the year, demand for air-conditioning maintenance may be high and service providers 160 may already be fully booked for work. However, based upon prevailing factors, certain service providers 160 may be willing to handle additional work. Accordingly, success of system 100, and specifically service provider selection algorithm 140, to successfully find a service provider 160 for service requirement 132, may be improved through use of artificial intelligence and other learning algorithms that take into account the above factors to increase the size and capability of the service provider pool.

Figure 8:
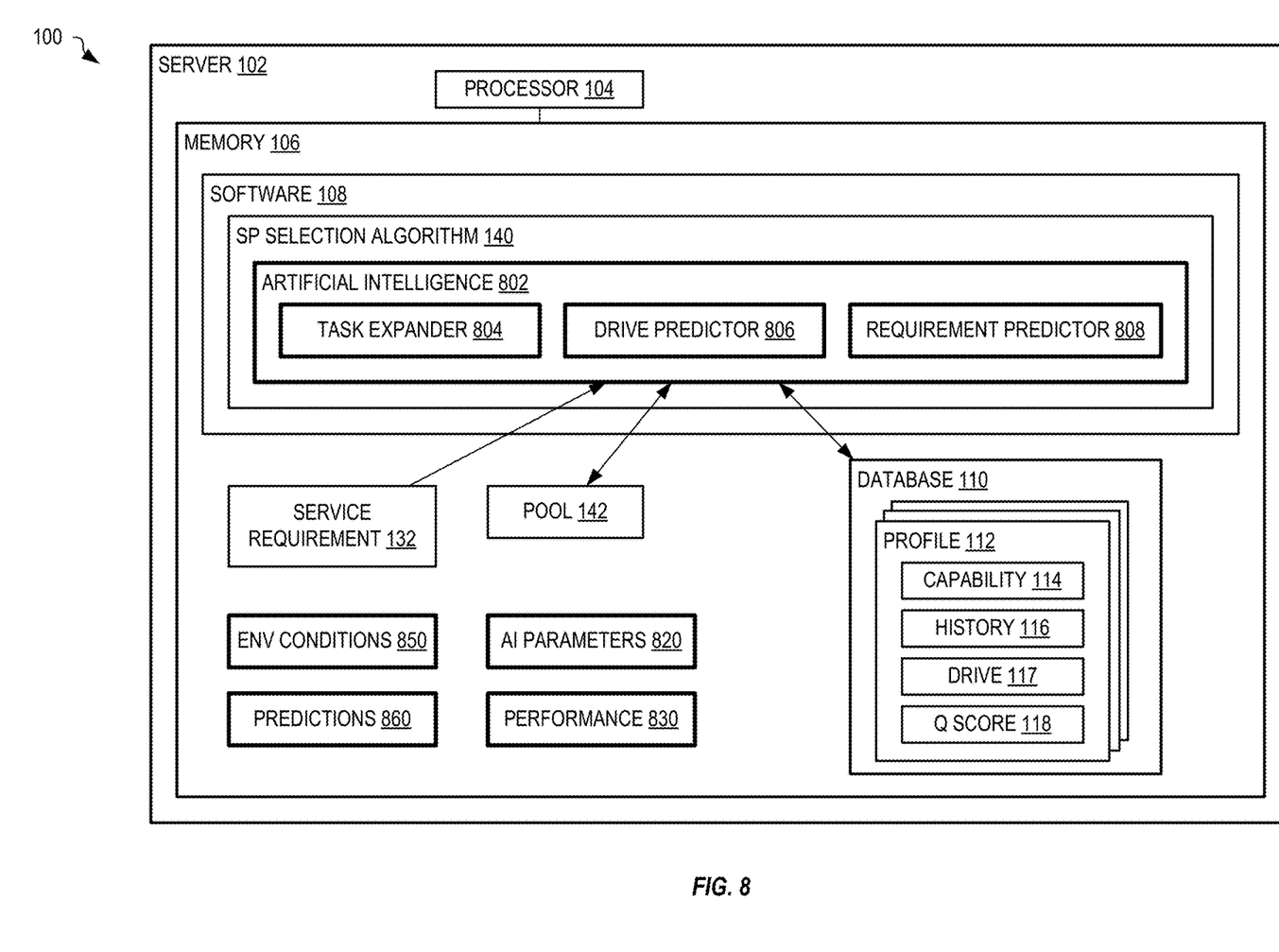
FIG. 8 shows the SP selection algorithm of FIG. 1 using artificial intelligence to increase probability of selecting a service provider to fulfill the customer service requirement, in an embodiment.

FIG. 8 shows service provider selection algorithm 140 of FIG. 1 implementing and/or using artificial intelligence (AI) to increase probability of selecting service provider 160 to fulfill the customer service requirement 132. System 100 further includes AI 802 that is shown with a task expander 804, a drive predictor 806, and a requirement predictor 808 that cooperate to improve performance of system 100. Although shown as part of service provider selection algorithm 140, AI 802 may be external to service provider selection algorithm 140 (and may be implemented within another server) without departing from the scope of the embodiments herein.

Requirement predictor 808 may evaluate environmental conditions 850 and generate predictions 860 based upon historical data, such as history 116. Environmental conditions 850 may indicate a current time (e.g., time of day, day of month, month of year), seasonal information, predicted weather (e.g., a forecast from a weather service) and so on. Predictions 860 may include a prediction of service requirements for each different type of service identified within capabilities 114. For example, requirement predictor 808 may generate predictions 860 to indicate that air-conditioning service requirements will be high in the Denver area for the first week of May, based upon environmental conditions 850 that indicate that this week is forecast to have an average temperature greater than 72 F. In another example, requirement predictor 808 may generate predictions 860 to indicate expected demand for certain types of service based upon actual service requirement volumes of previous years, as stored within history 116, for example.

Task expander 804 processes profiles 112 within database 110 based upon AI parameters 820 to extend capability 114 of one or more service providers 160. For example, task expander 804 may match certain service types within capability 114 to AI parameters 820 to identify additional services that may add to capability 114. For example, AI parameters 820 may indicate that where capability 114 of service provider 160 indicates water heater repair, capability 114 should also indicate water heater installation. Such AI parameters 820 may be determined by processing capability 114 of a plurality of service providers 160 within database 110 to determine capabilities that are frequently associated together (e.g., water heater repair and water heater installation). Accordingly, task expander 804 may add certain tasks to capability 114 where it is likely that the service provider 160 also provides those services.

Drive predictor 806 may adjust drive 117 of each service provider 160 based upon AI parameters 820, environmental conditions 850, and/or predictions 860. Drive predictor 806 evaluates environmental conditions 850 and predictions 860 together with capability 114 and history 116 of each service provider 160 to adjust drive 117. For example, where, for service provider 160, drive 117 is initially low, thereby reducing the likelihood of the service provider being selected to fulfill service requirement 132, drive predictor 806 may increase drive 117 where predictions 860 indicate high demand for a certain type of service that is provided by service provider 160 and service provider 160 has previously accepted service requirements when already near maximum work capacity. Accordingly, service providers 160 that are likely to respond to a service request will indicate greater drive 117 than those less likely to respond.

Self-Tuning

During operation of system 100, a performance 830 of system 100 may be determined. For example, AI 802 may generate performance 830 to correlate adjustments made to one or both of capability 114 and drive 117 against results achieved by system 100 using those adjustments. Accordingly, AI 802 may self-tune by adjusting AI parameters 820 based upon performance 830. In one embodiment, AI 802 includes or uses a convolutional neural network that is trained to improve performance of system 100 over time based upon continually monitored performance 830, thereby learning and continually improving operation and success of system 100 to match service providers 160 to customer service requirements 132. For example, where task expander 804 predicted that service provider 160 would offer water heater installation, since capability 114 indicates that service provider 160 provides water heater repair, but service provider 160 has never responded to a notification where service requirement 132 is for water heater installation, AI 802 may learn that service provider 160 does not offer water heater installation as predicted, and therefore not include service provider 160 for future service requirements 132 for water heater installation. In another example, based upon performance 830, AI 802 may learn that even though service provider 160 had reached indicated capacity, service provider 160 still accepted and successfully completed additional service requirements 132, indicating willingness of service provider 160 to receive more leads than requested.

AI 802 may also evaluate response times of service providers 160 to provided leads (see FIG. 6 and associated description above) to automatically determine preferences of the service provider 160 for receiving notifications of these leads. Where service provider 160 only responds to lead notifications at certain times (e.g., time of day, day of week), AI 802 may learn to only provide notifications to the service provider 160 at these times. For example, service provider 160 may only respond to a notification of a new lead first thing in the morning, at noon, and then after four PM; accordingly, AI 802 learns to send notifications to service provider 160 only at these times. In certain embodiments, AI 802 may compare response times of service provider 180 when receiving many notifications per hour to response times of service provider 160 when receiving a few notifications per hour, to determine an optimal notification rate for service provider 160. For example, service provider 160 may respond slowly or become non-responsive when receiving too many notifications during the day, whereas service provider 160 may respond quickly when receiving only a few notifications during the day. Accordingly, AI 802 may learn, for each service provider 160, how to achieve optimal responses.

In another example, AI 802 may correlate response times to notifications of service provider 160 to acceptance of work, thereby automatically determining a work capacity of service provider 160.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method comprising:
   determining, with a server, a service provider drive for each service provider of a plurality of service providers stored in a repository, the service provider drive is based on a throughput capacity of the each service provider, the throughput capacity is based on at least one of a service provider budget for service leads, a service provider work load, or a number of service requirements that the service provider is likely to fulfill;
   receiving, with the server, a service request comprising a requested type of service, a requested service location, and a requested service time period;
   accessing, with the server, the repository to retrieve a qualified service provider being associated with a type of service, a service region, a response status, and the service provider drive based on the throughput capacity of the qualified service provider, the response status of the qualified service provider is based on a Q score indicative of a probability of the qualified service provider being available to provide the requested type of service within the requested service time period;
   analyzing, with the server, the plurality of service providers stored in the repository to identify, based upon the service request, the qualified service provider from the plurality of service providers that provides the requested type of service to a region that includes the requested type of service to a region that includes the requested service location, that has a qualifying response status greater than a first predefined threshold and, that has a qualifying service provider drive greater than a second predefined threshold;
   determining, with the server, a service provider device associated with the qualified service provider;
   sending, with the server, the service request to the service provider device,
   wherein the service request triggers a service provider application of the service provider device to display an interactive graphical user interface that presents the service request and provides a user an opportunity to respond to the service request, and
   wherein the Q score is defined as follows:

$$q_i = \frac{o \cdot h_i + \frac{s}{1+n_i} \cdot r_i \cdot \sqrt{o \cdot \text{abs}(h_i) \cdot \text{abs}(1-h_i)}}{o} - t_i$$

wherein
   D=a number of days counting back from a reference day,
   C=a number of historical confirmed service database (SDB) appointments over D days,
   N=a number of historical attempted SDB appointments over D days,
   P=C/N, and
   For a particular service provider (SP),
      $c_i$=a number of historical, confirmed SDB appointments for SP over D days,
      $n_i$=a number of historical, attempted SDB appointments for SP over D days, however
      if $n_i > 0$, $p_i = c_i/p_i$, or
      if $n_i = 0$, $p_i = P$,
      $r_i$=a random number drawn from a normal distribution with mean=0 and standard deviation=1,
      $t_i$=a random number drawn from drawn from a normal distribution with mean=0 and standard deviation=1, and
      $h_i = p_i + t_i$,
   where D, d, o and s are globally-set tuning parameters, and abs is an absolute value function.

2. The method of claim 1, further comprising:
   sending, with the server, a second confirmation of service communication to a customer device, in response to receiving by the server of a first confirmation of service communication from the service provider device.

3. The method of claim 2, further comprising generating, with the server, a schedule for service of the service request by the qualified service provider.

4. The method of claim 1, the response status being based upon responsiveness of the qualified service provider for similar service requests.

5. The method of claim 1, further comprising predicting future service requests for the service request type based upon the requested service time period of previous service requests for that service type.

6. The method of claim 1, further comprising expanding service types offered by one service provider based upon service types offered by other service providers.

7. The method of claim 1, further comprising predicting the service provider drive of the each service provider based on the throughput capacity and the response status of the each service provider.

8. The method of claim 1, further comprising adjusting parameters of an artificial intelligence algorithm, hosted on the server, that matches service requests to qualified service providers, and that predicts one or more of future service requests, expanded service types, and service provider drives of the qualified service providers.

9. The method of claim 8, wherein the adjusting parameters of the artificial intelligence algorithm includes:
    determining commonly linked service capabilities by analyzing the repository of service providers,
    adding an expanded service capability to the service capabilities of one of the plurality of service providers based on its analysis of the repository of service providers,
    linking the service request to the one of the plurality of service providers, based upon the expanded service capability,
    monitoring a service outcome stemming from linking the service request to the one of the plurality of service providers, and
    adjusting the parameters of the artificial intelligence algorithm, and updates a system performance score, based upon the service outcome of linking the service request to the qualified service provider.

10. A method comprising:
    determining, with a server, a service provider drive for each service provider of a plurality of service providers stored in a repository, the service provider drive is based on a throughput capacity of the each service provider, the throughput capacity is based on at least one of a service provider budget for service leads, a service provider work load, or a number of service requirements that the service provider is likely to fulfill;
    receiving, with the server, the service request comprising a requested type of service, a requested service location, and a requested service time period;
    accessing, with the server, the repository to retrieve a qualified service provider being associated with a type of service, a service region, a response status based upon a Q score, and the service provider drive based on the throughput capacity of the qualified service provider;
    analyzing, with the server, the repository of to identify, based upon the service request, one or more qualified service providers that provide the requested type of service to a region that includes the requested type of service to a region that includes the requested service location, that have qualifying response statuses greater than a first predefined threshold and, that have qualifying service provider drives greater than a second predefined threshold;
    determining, with the server, a service requestor device associated with the service request;
    in response to a quantity of the one or more qualified service providers being insufficient to ensure a desired probability of servicing the service request, sending, with the server, a communication to the service requestor device indicating that the service request cannot be serviced within the requested service time period; and
    in response to the quantity of the one or more qualified service providers being sufficient to ensure the desired probability of servicing the service request, sending, with the server, a communication to the service requestor device indicating that the service request can be serviced within the requested service time period,
    wherein the Q score is defined as follows:

$$q_i = \frac{o \cdot h_i + \frac{s}{1+n_i} \cdot r_i \cdot \sqrt{o \cdot \text{abs}(h_i) \cdot \text{abs}(1-h_i)}}{o} - t_i$$

wherein
    D=a number of days counting back from a reference day,
    C=a number of historical confirmed service database (SDB) appointments over D days,
    N=a number of historical attempted SDB appointments over D days,
    P=C/N, and
    For a particular service provider (SP),
        $c_i$=a number of historical, confirmed SDB appointments for SP over D days,
        $n_i$=a number of historical, attempted SDB appointments for SP over D days, however
            if $n_i>0$, $p_i=c_i/p_i$, or
            if $n_i=0$, $p_i=P$,
        $r_i$=a random number drawn from a normal distribution with mean=0 and standard deviation=1,
        $t_i$=a random number drawn from drawn from a normal distribution with mean=0 and standard deviation=1, and
        $h_i=p_i+t_i$,
    where D, d, o and s are globally-set tuning parameters, and abs is an absolute value function.

11. The method of claim 10, the response status being based upon responsiveness of the one or more qualified service providers for similar service requests.

12. The method of claim 10, further comprising adjusting parameters of an artificial intelligence algorithm, hosted on the server, that matches service requests to qualified service providers, and that predicts one or more of future service requests, expanded service types, and service provider drives of the qualified service providers,
    wherein the adjusting parameters of the artificial intelligence algorithm includes:
        determining commonly linked service capabilities by analyzing the repository of service providers,
        adding an expanded service capability to the service capabilities of one of the plurality of service providers based on its analysis of the repository of service providers,
        linking the service request to the one of the plurality of service providers, based upon the expanded service capability,
        monitoring a service outcome stemming from linking the service request to the one of the plurality of service providers, and
        adjusting the parameters of the artificial intelligence algorithm, and updates a system performance score, based upon the service outcome of linking the service request to the qualified service provider.

* * * * *